US012612470B2

(12) United States Patent
Taniguchi et al.

(10) Patent No.: US 12,612,470 B2
(45) Date of Patent: Apr. 28, 2026

(54) RUBBER COMPOSITION PRODUCTION METHOD, RE-CROSSLINKED RUBBER, TIRE, AND RUBBER INDUSTRIAL PRODUCT

(71) Applicant: BRIDGESTONE CORPORATION, Tokyo (JP)

(72) Inventors: Masayuki Taniguchi, Tokyo (JP); Takumi Toda, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 539 days.

(21) Appl. No.: 18/031,075

(22) PCT Filed: Oct. 15, 2021

(86) PCT No.: PCT/JP2021/038155
§ 371 (c)(1),
(2) Date: Apr. 10, 2023

(87) PCT Pub. No.: WO2022/080475
PCT Pub. Date: Apr. 21, 2022

(65) Prior Publication Data
US 2023/0374164 A1    Nov. 23, 2023

(30) Foreign Application Priority Data

Oct. 15, 2020    (JP) ................................. 2020-173853
Jan. 18, 2021    (JP) ................................. 2021-005661

(51) Int. Cl.
| | |
|---|---|
| *C08C 19/08* | (2006.01) |
| *B60C 1/00* | (2006.01) |
| *C08F 8/50* | (2006.01) |
| *C08F 36/06* | (2006.01) |
| *C08F 36/08* | (2006.01) |

(52) U.S. Cl.
CPC ................ *C08C 19/08* (2013.01); *B60C 1/00* (2013.01); *C08F 8/50* (2013.01); *C08F 36/06* (2013.01); *C08F 36/08* (2013.01)

(58) Field of Classification Search
CPC .......... C08C 19/08; B60C 1/00; Y02W 30/62;
C08J 11/22; C08J 2317/00; C08J 2319/00; C08F 236/10; C08F 136/08; C08F 8/50; C08F 36/06; C08F 36/08
See application file for complete search history.

(56) References Cited

U.S. PATENT DOCUMENTS

| | | | | |
|---|---|---|---|---|
| 3,896,059 | A | * | 7/1975 | Wakefield .............. C08G 61/00 |
| | | | | 521/42.5 |
| 6,722,593 | B1 | | 4/2004 | Dobozy |
| 2008/0139678 | A1 | | 6/2008 | Fan et al. |

FOREIGN PATENT DOCUMENTS

| | | |
|---|---|---|
| EP | 3 327 080 A1 | 5/2018 |
| EP | 3 753 977 A1 | 12/2020 |
| GB | 1 595 810 A | 8/1978 |
| JP | 53-134081 A | 11/1978 |
| JP | 2003-534956 A | 11/2003 |
| JP | 2007-277310 A | 10/2007 |
| JP | 2015-91991 A | 5/2015 |
| WO | 2012/115528 A2 | 8/2012 |
| WO | 2019/160088 A1 | 8/2019 |

OTHER PUBLICATIONS

Ren, Journal of Computer Aided Molecular Design 17: 607-620, 2003 (Year: 2003).*
Extended European Search Report dated Mar. 14, 2024 in Application No. 21880210.6.
International Search Report dated Dec. 28, 2021 in International Application No. PCT/JP2021/038155.

* cited by examiner

*Primary Examiner* — Robert C Boyle
(74) *Attorney, Agent, or Firm* — Sughrue Mion, PLLC

(57)    ABSTRACT
Provided are a liquid hydrocarbon production method for obtaining a liquid hydrocarbon-containing rubber composition, including heating a crosslinked rubber at 300° C. or lower in a reaction solvent that contains an aldehyde having a hydrocarbon group with 2 or more carbon atoms and having a boiling point of 230° C. or lower; as well as a re-crosslinked rubber obtained from the rubber composition produced in the production method, and a tire and a rubber industrial product. According to the liquid hydrocarbon production method, a liquid hydrocarbon having a higher molecular weight can be produced at a high decomposition proportion even under mild conditions.

20 Claims, No Drawings

RUBBER COMPOSITION PRODUCTION METHOD, RE-CROSSLINKED RUBBER, TIRE, AND RUBBER INDUSTRIAL PRODUCT

CROSS REFERENCE TO RELATED APPLICATIONS

This application is a National Stage of International Application No. PCT/JP2021/038155 filed Oct. 15, 2021, claiming priorities based on Japanese Patent Application No. 2020-173853 filed Oct. 15, 2020 and Japanese Patent Application No. 2021-005661 filed Jan. 18, 2021.

TECHNICAL FIELD

The present invention relates to a method of producing a rubber composition, a re-crosslinked rubber, a tire, and a rubber industrial product.

BACKGROUND ART

From the viewpoint of environment and resource saving, it has been studied to regenerate a crosslinked rubber and reuse it as a new crosslinked rubber.

For example, PTL 1 discloses a method for producing rubber composition containing a liquid hydrocarbon by heating a crosslinked rubber at 300° C. or lower in a reaction solvent containing a primary alcohol having 2 or more carbon atoms.

CITATION LIST

Patent Literature

PTL 1: WO2019/160088

SUMMARY OF INVENTION

Technical Problem

According to the method described in PTL 1, however, a liquid hydrocarbon can be recovered at a high yield even in a mild condition, but for obtaining a liquid hydrocarbon having a high molecular weight, further investigations are necessary.

An object of the present invention is to provide a production method for a rubber composition capable of producing a liquid hydrocarbon having a higher molecular weight at a high decomposition proportion even in a mild condition, and to provide a re-crosslinked rubber, a tire and a rubber industrial product obtained from the rubber composition produced by the production method, and the subject matter of the invention is to achieve the object.

Solution to Problem

<1> A method for a producing rubber composition for obtaining a rubber composition containing a liquid hydrocarbon, which includes heating a crosslinked rubber at 300° C. or lower in a reaction solvent that contains an aldehyde having a hydrocarbon group with 2 or more carbon atoms and having a boiling point of 230° C. or lower.
<2> The production method for a rubber composition according to <1>, wherein the carbon number of the hydrocarbon group is 3 to 16.

<3> The production method for a rubber composition according to <1> or <2>, wherein the carbon number of the hydrocarbon group is 6 to 10.
<4> The production method for a rubber composition according to any one of <1> to <3>, wherein the hydrocarbon group is a linear saturated aliphatic group.
<5> The production method for a rubber composition according to any one of <1> to <4>, wherein the aldehyde contains nonanal.
<6> The production method for a rubber composition according to any one of <1> to <5>, wherein the crosslinked rubber is heated at 150 to 250° C.
<7> The production method for a rubber composition according to any one of <1> to <6>, wherein the crosslinked rubber is a crosslinked product of a rubber component containing 50 to 100% by mass of a dienic rubber.
<8> The production method for a rubber composition according to any one of <1> to <7>, wherein the crosslinked rubber contains a vulcanized rubber.
<9> A re-crosslinked rubber obtained by re-crosslinking the rubber composition produced according to the rubber composition production method of any one of <1> to <8>, wherein the rubber composition contains, as a rubber component, a liquid hydrocarbon produced according to the rubber composition production method of any one of <1> to <7>, and the content of the liquid hydrocarbon in the rubber component is 1 to 100% by mass.
<10> A tire formed of the re-crosslinked rubber of <9>.
<11> A rubber industrial product formed of the re-crosslinked rubber of <9>.

Advantageous Effects of Invention

According to the present invention, there can be provided a production method for a rubber composition capable of producing a liquid hydrocarbon having a higher molecular weight at a high decomposition proportion even in a mild condition, as well as a re-crosslinked rubber, a tire and a rubber industrial product obtained from the rubber composition produced by the production method.

DESCRIPTION OF EMBODIMENTS

<Rubber Composition Production Method>

The rubber composition production method of the present invention includes a step of obtaining a liquid hydrocarbon-containing rubber composition by heating a crosslinked rubber, at 300° C. or lower, in a reaction solvent that contains an aldehyde having a hydrocarbon group with 2 or more carbon atoms and having a boiling point of 230° C. or lower (hereinafter this may be referred to as "decomposition step").

The rubber composition production method of the present invention can have, in addition to the decomposition step, a drying step of drying the reaction product obtained in the decomposition step.

The liquid hydrocarbon in the rubber compositions produced by the production method of the present invention is a rubber molecule that constitute the crosslinked rubber, and also it depends on the constitution of the crosslinked rubber but in the case of a crosslinked rubber of waste tire, the liquid hydrocarbon generally includes a natural rubber, and a styrene-butadiene copolymer rubber and the like. "Liquid" means that, at room temperature (25° C.) and under an atmospheric pressure (0.1 MPa), the substance can be in a liquid state or can be readily solubilized in a petroleum component (e.g., alcohol, diethyl ether, tetrahydrofuran) to be in a liquid state.

In the rubber composition production method of the present invention, it is considered that carbon-carbon bonds between rubber molecules that constitute a crosslinked rubber (carbon-carbon bonds), carbon-hetero (e.g., oxygen atom, sulfur atom) bonds (for example, carbon-sulfur bonds) derived from crosslinking agent and the like can be cleaved by heating or by a solvent effect to produce radicals and/or new bonds. It is also considered that hydrogen atoms released from the aldehyde having a hydrocarbon group with 2 or more carbon atoms are attracted by the high-reactive radical species formed by the bond cleavage to stop the radical reaction. It is further considered that the aldehyde having a hydrocarbon group with 2 or more carbon atoms can more readily generate hydrogen donation than alcohols to thereby more readily stop radical reaction, that is, radical reaction can be thereby readily stopped. Also, the primary aldehyde is oxidized by the oxygen necessary for cleaving the main chain of rubber molecules to be changed into a primary carboxylic acid, and accordingly oxygen in an autoclave can be thereby consumed. As a result, it is considered that main chain cleavage can be suppressed, and a liquid hydrocarbon having a higher molecular weight than usual can be obtained at a high decomposition proportion.

Herein details of the rubber composition production method of the present invention are described.

[Crosslinked Rubber]

The crosslinked rubber is a crosslinked product of a rubber component.

The rubber component as a raw material for the crosslinked rubber can be any of a dienic rubber or a non-dienic rubber.

The dienic rubber includes at least one selected from the group consisting of a natural rubber (NR) and a synthetic dienic rubber.

Examples of the synthetic dienic rubber include a polyisoprene rubber (IR), a styrene-butadiene copolymer rubber (SBR), a polybutadiene rubber (BR), an ethylene-propylene-diene rubber (EPDM), a chloroprene rubber (CR), a halogenated butyl rubber, an acrylonitrile-butadiene rubber (NBR).

Examples of the non-dienic rubber include a butyl rubber, an ethylene-propylene rubber, a urethane rubber, a silicone rubber and an acrylic rubber.

One kind alone or two or more kinds of these rubber components can be used either singly or as combined.

Among the above, the rubber component preferably contains a dienic rubber in an amount of 50% by mass or more, since a dienic rubber is generally used in rubber products such as tires. Specifically, the crosslinked rubber is preferably a crosslinked product of a rubber component containing 50 to 100% by mass of a dienic rubber. More preferably, the rubber component contains a dienic rubber in an amount of 70% by mass or more, even more preferably contains a dienic rubber in an amount of 90% by mass or more. Also preferably, the dienic rubber is at least one selected from the group consisting of a natural rubber, a polyisoprene rubber and a styrene-butadiene copolymer rubber.

The crosslinking agent for the rubber component is not specifically limited, and examples thereof include a sulfur-based crosslinking agent, an organic peroxide-based crosslinking agent, an acid-based crosslinking agent, a polyamine-based crosslinking agent, a resin-based crosslinking agent, a sulfur compound-based crosslinking agent, and an oxime-nitrosoamine-based crosslinking agent.

For rubber components such as tires, a sulfur-based crosslinking agent (vulcanizing agent) is generally used, and therefore the crosslinked rubber preferably contains a vulcanized product as vulcanized with a vulcanizing agent, that is, a vulcanized rubber.

It is considered that, by heating a vulcanized rubber at 300° C. or lower in a reaction solvent containing an aldehyde having a hydrocarbon group with 2 or more carbon atoms, the carbon-sulfur bonds mainly constituting the molecular structure of the vulcanized rubber can be cleaved by heat or can undergo interchange reaction by a solvent effect or the like, and the hydrogen atoms released from the aldehyde having a hydrocarbon group with 2 or more carbon atoms can be thus attracted by the high-reactive radical species formed by the bond cleavage to stop the radical reaction.

The content of the vulcanized rubber in the crosslinked rubber is preferably 50% by mass or more, more preferably 70% by mass or more, even more preferably 90% by mass or more, and especially preferably, the crosslinked rubber is a vulcanized rubber (the content thereof is 100% by mass).

(Filler)

The crosslinked rubber can contain a filler.

Tires generally contain a reinforcing filler such as carbon black or silica, for the purpose of improving various functions such as durability and wear resistance of tires.

As the filler, any one of silica and carbon black can be used alone, or both silica and carbon black can be used.

Silica is not specifically limited, and any of ordinary-grade silica, or special silica surface-treated with a silane coupling agent can be used depending on the intended use. As silica, for example, a wet-process silica is preferably used.

Carbon black is not specifically limited, and can be appropriately selected depending on the intended use. As carbon black, for example, FEF, SRF, HAF, ISAF or SAF grade is preferred.

The content of the filler in the crosslinked rubber is preferably 20 to 100 parts by mass relative to 100 parts by mass of the rubber component, more preferably 30 to 90 parts by mass.

The crosslinked rubber can be a crosslinked product produced by crosslinking a rubber composition containing as needed in addition to a rubber component and the above-mentioned filler, blending agents generally used in the rubber industry, for example, a softener, stearic acid, an antiaging agent, zinc oxide and a vulcanization accelerator. Tires generally contain a vulcanized rubber produced by vulcanizing a rubber composition containing these blending agents.

[Reaction Solvent]

The reaction solvent contains an aldehyde having a hydrocarbon group with 2 or more carbon atoms and having a boiling point of 230° C. or lower.

As the reaction solvent, by selecting such an aldehyde having a hydrocarbon group with 2 or more carbon atoms and having a boiling point of 230° C. or lower, the crosslinking points of a crosslinked rubber can be decomposed but the main chain of rubber molecules can be suppressed from being cleaved, and the molecular weight of the liquid hydrocarbon to be recovered can be kept high. The reason is considered because, when an alcohol is used as a reaction solvent, oxidative degradation may occur, but an aldehyde would hardly cause oxidative degradation.

When the carbon number of the hydrocarbon group that the aldehyde has is less than 2, the molecular weight of the liquid hydrocarbon to be recovered cannot be kept high.

From the viewpoint of keeping the molecular weight of the liquid hydrocarbon to be recovered higher, the carbon number of the hydrocarbon group is preferably 3 to 16, more preferably 4 to 14, preferably 4 to 12, further preferably 6 to 10.

The boiling point of the reaction solvent is 230° C. or lower at room temperature (25° C.) and under an atmospheric pressure (0.1 MPa).

When the boiling point of the reaction solvent is higher than 230° C., purification becomes difficult. The lower limit of the boiling point is not specifically limited and is generally higher than 80° C., and preferably the reaction solvent is liquid at 25° C.

The boiling point of the reaction solvent is preferably 85° C. or higher, more preferably 90° C. or higher, even more preferably 95° C. or higher, further more preferably 100° C. or higher, further more preferably 105° C. or higher. Also preferably, the boiling point of the reaction solvent is 225° C. or lower, more preferably 220° C. or lower.

The hydrocarbon group that the aldehyde has is not specifically limited so far as the boiling point is 230° C. or lower and the carbon number is 2 or more, and examples thereof include an aliphatic group and an aromatic group.

The aliphatic group can be linear or branched, and can be a saturated aliphatic group or an unsaturated aliphatic group. Examples of the aliphatic group include an ethyl group, a 1-propyl group, a 1-butyl group, a 2-butyl group, a tert-butyl group, a 1-pentyl group, a 2-methyl-1-pentyl group, a 1-hexyl group, a 1-heptyl group, a 1-octyl group, a 1-nonyl group, a 1-decyl group, a 1-dodecyl group; a vinyl group and a propenyl group.

The aromatic group includes a phenyl group and a naphthyl group, for example.

One kind alone or two or more kinds of aldehydes having a hydrocarbon group with 2 or more carbon atoms can be used either singly or as combined. Not specifically limited except having the above-mentioned hydrocarbon group, the aldehyde can have any other substituent such as a halogen atom, an alkoxy group, an amino group, a nitro group, a sulfonyl group and a hydroxy group. The carbon number of the alkyl group (R) in the alkoxy group (RO—) is preferably 1 to 8.

Specific examples of the aldehyde having a hydrocarbon group with 2 or more carbon atoms and having a boiling point of 230° C. or lower include an aldehyde having a propyl group (propanal), an aldehyde having a butyl group (butanal), an aldehyde having a pentyl group (pentanal), an aldehyde having a hexyl group (hexanal), an aldehyde having a heptyl group (heptanal), an aldehyde having an octyl group (octanal), an aldehyde having a nonyl group (nonanal), an aldehyde having a decyl group (decanal), and an aldehyde having a phenyl group (benzaldehyde, cinnamaldehyde). The aldehyde can be an alkyl group in the side chain, and in the case of an aldehyde having a phenyl group, examples thereof include an alkylcinnamaldehyde, and amylcinnamaldehyde is preferred. In the case of having isomers, the aldehyde includes isomers.

As the aldehyde having a hydrocarbon group with 2 or more carbon atoms and having a boiling point of 230° C. or lower, usable are solvents manufactured by various chemical reagent manufacturers, such as those by Tokyo Chemical Industry Co., Ltd., or those by FUJIFILM Wako Pure Chemical Corporation.

The boiling point of the reaction solvent can be confirmed by catalogues of various chemical reagent manufacturers, or can also be confirmed by various printed books, for example, "Chemical Dictionary" by Tokyo Kagaku Dojin Publishing Co., Ltd., or "Chemical Handbooks" by Maruzen Publishing Co., Ltd.

For example, in catalogues by Tokyo Chemical Industry Co., Ltd., the boiling point of 1-hexanal is 131° C., the boiling point of 1-heptanal is 155° C., the boiling point of 1-octanal is 170° C., the boiling point of 1-nonanal is 192° C., the boiling point of 1-decanal is 208° C., and the boiling point of benzaldehyde is 179° C.

Among the above, the hydrocarbon group is preferably an aliphatic group from the viewpoint of keeping the molecular weight of the liquid hydrocarbon to be recovered higher, more preferably a saturated aliphatic group, even more preferably a linear saturated aliphatic group.

Specifically, the aldehyde having a hydrocarbon group with 2 or more carbon atoms and having a boiling point of 230° C. or lower is preferably at least one selected from the group consisting of an aldehyde having a hexyl group (hexanal), an aldehyde having a heptyl group (heptanal), an aldehyde having an octyl group (octanal) and an aldehyde having a nonyl group (nonanal), more preferably an aldehyde having a nonyl group (nonanal).

The reaction solvent can be composed of an aldehyde having a hydrocarbon group with 2 or more carbon atoms and having a boiling point of 230° C. or lower, or can contain, in addition to the aldehyde, any other solvent, but from the viewpoint of increasing the decomposition proportion of a liquid hydrocarbon, preferably, an aldehyde having a hydrocarbon group with 2 or more carbon atoms and having a boiling point of 230° C. or lower is a main component of the reaction solvent.

Here, the main component means that the content of the aldehyde having a hydrocarbon group with 2 or more carbon atoms and having a boiling point of 230° C. or lower in the reaction solvent is more than 50% by volume, and the content of the aldehyde having a hydrocarbon group with 2 or more carbon atoms and having a boiling point of 230° C. or lower in the reaction solvent is preferably 70% by volume or more, more preferably 90% by volume or more, and can be 100% by volume or more.

In the decomposition step, preferably the reaction solvent is used so that the ratio of the volume [mL] (Vs) of the reaction solvent to the mass [mg] (Wg) of the crosslinked rubber (Vs/Wg) can be within a range of 0.001/1 to 1/1, more preferably 0.005/1 to 0.1/1.

When the reaction solvent is used in the above range, solvolysis reaction can be accelerated more, and sufficient hydrogen atoms can be supplied to the crosslinked rubber to prevent recombination of the radicals formed by thermal decomposition, and therefore the crosslinked rubber can be decomposed efficiently.

[Reaction Condition in Decomposition Step]

(Temperature)

In the decomposition step, a crosslinked rubber and a reaction solvent are heated at 300° C. or lower.

When the heating temperature is 300° C. or lower, the step can be excellent in energy saving and can suppress reduction of the decomposition proportion by side reaction or the like. The heating temperature in the decomposition step may be referred to as a decomposition temperature. By heating a crosslinked rubber at a lower temperature, the solvent-implicated reaction can go on preferentially to decompose the crosslinked rubber. The heating temperature is preferably 150° C. or higher, more preferably 155° C. or higher, even more preferably 160° C. or higher, further more preferably higher than 180° C., and is also preferably 250° C. or lower, more preferably 240° C. or lower, even more preferably 230° C. or lower, further more preferably 220° C. or lower, further more preferably 210° C. or lower.

(Decomposition Time)

In the decomposition step, the time for heating the crosslinked rubber (decomposition time) is, from the viewpoint of sufficiently promoting the crosslinked rubber decomposition reaction, preferably 30 minutes to 20 hours, more preferably 60 minutes to 18 hours. In the case where the crosslinked rubber does not contain a filler, the decomposition time can be 240 minutes or less, preferably 180 minutes or less.

(Pressure)

In the decomposition step, the pressure to be applied to the crosslinked rubber and the reaction solvent is not specifically limited.

From the viewpoint of the reaction speed of the crosslinked rubber decomposition reaction and resource saving and energy saving, the pressure is preferably 0.1 to 2.0 MPa (G), more preferably 0.1 to 1.5 MPa (G). The unit "MPa (G)" means that the pressure is a gauge pressure.

When the pressure is 2.0 MPa (G) or less, the molecular weight of the resultant liquid hydrocarbon is hardly reduced, and when the pressure is 0.1 MPa (G) or more, the reaction solvent can readily penetrate into the crosslinked rubber so that the reaction speed can be readily increased.

(Atmosphere)

The reaction atmosphere in the decomposition step at 300° C. or lower is not specifically limited, and the reaction can be carried out in a vapor atmosphere of an inert gas such as an argon gas or a nitrogen gas (hereinafter simply referred to as an inert gas atmosphere), or can be carried out in a vapor atmosphere of air (hereinafter simply referred to as an air atmosphere), or can also be carried out in a mixed gas atmosphere of air and an inert gas. In the case where an inert gas is used, two or more kinds of inert gases can be used as combined.

From the viewpoint of carrying out the crosslinked rubber decomposition in a simpler equipment to promote energy saving, the crosslinked rubber is preferably heated in an aerobic atmosphere, that is, heated in an oxygen-containing atmosphere, more preferably heated in a gaseous atmosphere containing air, even more preferably heated in an air atmosphere.

[Drying Step]

The rubber composition production method of the present invention preferably includes a drying step of drying the reaction product (liquid hydrocarbon-containing rubber composition) obtained in the decomposition step.

The reaction product can be given a jet of hot wind at a temperature of, for example, 100 to 150° C. The hot wind can be air or can be an inert gas such as a nitrogen gas.

As described above, by heating a crosslinked rubber at 300° C. or lower in a reaction solvent that contains an aldehyde having a hydrocarbon group with 2 or more carbon atoms and having a boiling point of 230° C. or lower, a liquid hydrocarbon-containing rubber composition can be obtained. The rubber composition thus obtained may be referred to as "organic decomposition product". The rubber composition (organic decomposition product) generally contains a solid matter that remains without decomposition, in addition to the liquid hydrocarbon-containing liquid product obtained by thermal decomposition of a crosslinked rubber. Further, in the case where waste tires are used as the crosslinked rubber, the tires generally contain a filler, and therefore the solid matter also contains the filler.

Of a crude rubber before vulcanization, in the case of an isoprene rubber (IR), in general, the weight-average molecular weight (Mw) is 1,200,000 or so, and the number-average molecular weight (Mn) is 400,000 or so; and in the case of a styrene-butadiene copolymer rubber (SBR), in general, the weight-average molecular weight (Mw) is 400,000 or so, and the number-average molecular weight (Mn) is 100,000 or so. When Mw and Mn of the resultant liquid hydrocarbon are closer to these values, it means that a rubber having a molecular chain close to that of the raw material rubber is obtained.

Mw and Mn of a liquid hydrocarbon can be measured, for example, through gel permeation chromatography (GPC).

The liquid hydrocarbon produced according to the above-mentioned method can be used in regeneration for a crosslinked rubber.

For regeneration for a crosslinked rubber, not only a liquid hydrocarbon alone is used as a raw material, but also a mixture of a liquid hydrocarbon and a solid matter obtained in the decomposition step, that is, the rubber composition obtained in the decomposition step can be, without separating a liquid hydrocarbon from the rubber composition and directly as it is, used as a raw material for a regenerated rubber.

In that manner, the rubber composition obtained according to the rubber composition production method of the present invention is a recycle rubber of a regenerable crosslinked rubber (re-crosslinked rubber), and the rubber composition production method of the present invention is a recycle rubber production method. However, the rubber composition (recycle rubber) in the present invention does not contain a powdery rubber formed by powdering a vulcanized rubber.

<Re-Crosslinked Rubber>

The re-crosslinked rubber of the present invention is a re-crosslinked rubber produced by re-crosslinking the rubber composition produced in the rubber composition production method of the present invention, and contains a liquid hydrocarbon contained in the rubber composition as a rubber component, and the content of the liquid hydrocarbon in the rubber component is 1 to 100% by mass.

In other words, the re-crosslinked rubber of the present invention is a re-crosslinked product of a rubber composition that contains the liquid hydrocarbon obtained by thermal decomposition of a crosslinked rubber, as a rubber component, and the rubber component contains a liquid hydrocarbon at least in an amount of 1% by mass and the content can be 100% by mass. The content of the liquid hydrocarbon in the rubber component can be 5% by mass or more, or can be 10% by mass or more, or can be 15% by mass or more, or can be 20% by mass or more. Also the content of the liquid hydrocarbon in the rubber component can be 70% by mass or less, or can be 60% by mass or less, or can be 50% by mass or less.

In the case where the content of the liquid hydrocarbon in the rubber component is less than 100% by mass, the other component to be used along with the liquid hydrocarbon is not specifically limited. The other rubber component to be used along with the liquid hydrocarbon may be referred to as a pure rubber component.

The pure rubber component is a rubber component described hereinabove as a rubber component of a raw material of a crosslinked rubber. Above all, preferred is at least one selected from the group consisting of a natural rubber (NR) and a synthetic dienic rubber, and more preferred is at least one selected from the group consisting of a natural rubber, a polyisoprene rubber, a polybutadiene rubber and a styrene-butadiene copolymer rubber.

The rubber composition to be a raw material for the re-crosslinked rubber of the present invention can contain a filler, a vulcanizing agent, a vulcanization accelerator, a softener, stearic acid, an antiaging agent and zinc oxide, in addition to the liquid hydrocarbon-containing rubber component.

As described above, the rubber composition produced by the rubber composition production method of the present invention contains a solid matter remaining without decomposition, in addition to the liquid hydrocarbon-containing liquid product obtained by thermal decomposition of a crosslinked rubber, and the solid matter may contain a filler.

The rubber composition to be a raw material for the re-crosslinked rubber can contain a solid matter remaining without decomposition. By producing a re-crosslinked rubber using the solid matter that remains without decomposition, along with the liquid hydrocarbon obtained by thermal decomposition of a crosslinked rubber, environmental loads can be reduced more.

The conditions for re-crosslinking of the rubber composition produced by the rubber composition production method of the present invention are not specifically limited.

The re-crosslinked rubber of the present invention can be a re-vulcanized rubber produced by vulcanizing a liquid hydrocarbon-containing rubber component with a vulcanizing agent.

<Tire>

The tire of the present invention is formed of the re-crosslinked rubber of the present invention.

Using a re-crosslinked rubber obtained by re-crosslinking a liquid hydrocarbon-containing rubber composition obtained by thermal decomposition of a crosslinked rubber, environmentally friendly tires can be produced.

For tires, an uncrosslinked rubber composition can be crosslinked after molding into tires, depending on the kind of tire and tire component, or via a pre-crosslinking step or the like, a semi-crosslinked rubber is once produced from an uncrosslinked rubber composition, and it is molded and then finally crosslinked to give the intended tire. The vapor to be filled into tires includes ordinary air or air having a controlled oxygen partial pressure, as well as an inert gas such as nitrogen, argon and helium.

<Rubber Industrial Product>

The rubber industrial product of the present invention is formed of the re-crosslinked rubber of the present invention.

Examples of the rubber industrial product include automobile members except the above-mentioned tire, hoses and tubes, anti-vibration rubbers, conveyor belts, crawlers, cables, sealants, ship members, and building materials. Using the re-crosslinked rubber of the present invention to constitute rubber industrial products, the environmental loads of the industrial products produced can be reduced.

EXAMPLES

Hereinunder the present invention is described in more detail with reference to Examples given below. These Examples are to exemplify the present invention and are not whatsoever to restrict the present invention.

<Preparation of Vulcanized Rubber>

The following vulcanized rubbers were prepared.

Vulcanized rubber (IR): a vulcanized rubber obtained by vulcanizing a polyisoprene rubber.

Vulcanized rubber (SBR): a vulcanized rubber obtained by vulcanizing a styrene-butadiene copolymer rubber Vulcanized rubber (NR): a vulcanized rubber obtained by vulcanizing a rubber composition containing at least a natural rubber and a carbon black.

<Liquid Hydrocarbon Production A>

Example 1a (Decomposition Step)

0.4 g of small chips of a vulcanized rubber (IR) having a size of about 1 mm and 5 mL of 1-nonanal were put into an autoclave (by EYELA Corporation, pressure-resistant container, trade name "HIP-30L"). The autoclave was airtightly closed, and put into a heating container (by EYELA Corporation, Personal Organic Synthesizer Chemistation, trade name "PPV-CTRL1"), and the contents in the autoclave were heated at 200° C. in an air atmosphere for 2 hours. After heated, the heating container was cooled with cooling water down to room temperature (25° C.), and the reaction product was made to be at room temperature.

(Drying Step)

Using a spray-type test tube concentrator (by EYELA Corporation, trade name "MGS-3100"), the reaction product obtained in the decomposition step was dried in a nitrogen flow at 130° C. to give an organic decomposition product of Example 1a.

Examples 2a to 6a, Comparative Examples 1a to 5a

Through the decomposition step and the drying step in the same manner as in Example 1a except that the reaction solvent was changed to the solvent shown in Table 1, organic decomposition products of Examples 2a to 6a, and Comparative Examples 1a to 5a were produced.

<Liquid Hydrocarbon Production B>

Examples 1b to 3b

Through the decomposition step and the drying step in the same manner as in Example 1a except that the heating temperature and the heating time for the contents in the decomposition step in Example 1a, 200° C. and 2 hours were changed to the reaction conditions shown in Table 2, organic decomposition products of Examples 1b to 2b were produced.

In Table 2, the results under the same conditions as in Example 1a are shown as Example 3b for comparison.

<Liquid Hydrocarbon Production C>

Examples 1c to 5c

Through the decomposition step and the drying step in the same manner as in Example 1a except that a vulcanized rubber (SBR) was used in place of the vulcanized rubber (IR) and the reaction solvent shown in Table 3 was used, organic decomposition products of Examples 1c to 5c were produced.

Comparative Example 1c

Through the decomposition step and the drying step in the same manner as in Comparative Example 1a except that a vulcanized rubber (SBR) was used in place of the vulcanized rubber (IR), an organic decomposition product of Comparative Example 1c was produced.

Comparative Example 2c

In the same manner as in Comparative Example 2a except that a vulcanized rubber (SBR) was used in place of the vulcanized rubber (IR), an organic decomposition product of Comparative Example 2c was produced.

Comparative Example 3c

In the same manner as in Comparative Example 3a except that a vulcanized rubber (SBR) was used in place of the vulcanized rubber (IR), an organic decomposition product of Comparative Example 3c was produced.

<Analysis of Organic Decomposition Product>

The organic decomposition product obtained in Examples and Comparative Examples was dissolved in tetrahydrofuran, and analyzed through gel permeation chromatography (GPC). From the analytical results, the solubilization ratio and the weight-average molecular weight (Mw) of the organic decomposition product were determined. In addition, using tetrahydrofuran solutions of a pure rubber component having a different concentration, a calibration curve was drawn. Using the calibration curve, the liquid hydrocarbon in tetrahydrofuran was quantified, and the decomposition proportion was calculated.

Conditions for GPC measurement are as follows.

Column: TSK gel GMHXL, by Tosoh Corporation

Eluent Tetrahydrofuran

Flow rate: 1 mL/min

Temperature: 40° C.

Detector: RI

In Table 1, the weight-average molecular weight (Mw) in Examples 1a to 6a and Comparative Examples 2a to 5a was indexed by setting the weight-average molecular weight (Mw) in Comparative Example 1a to 100.0. Also the decomposition proportion in Examples 1a to 6a and Comparative Examples 2a to 5a was indexed by setting the decomposition proportion in Comparative Example 1a to 100.0.

In Table 2, the weight-average molecular weight (Mw) in Examples 1b to 3b was indexed by setting the weight-average molecular weight (Mw) in Comparative Example 1a to 100.0. Also the decomposition proportion in Examples 1b to 3b was indexed by setting the decomposition proportion in Comparative Example 1a to 100.0.

In Table 3, the weight-average molecular weight (Mw) in Examples 1c to 5c and Comparative Examples 2c to 3c was indexed by setting the weight-average molecular weight (Mw) in Comparative Example 1c to 100.0. Also the decomposition proportion in Examples 1c to 5c and Comparative Examples 2c to 3c was indexed by setting the decomposition proportion in Comparative Example 1c to 100.0.

The results are shown in Tables 1 to 3.

TABLE 1

| | Reaction Solvent | Molecular Weight (Mw) (Index) | Decomposition proportion (Index) |
|---|---|---|---|
| Comparative Example 1a | 1-heptanol | 100.0 | 100.0 |
| Example 2a | 1-hexanal | 111.3 | 98.3 |
| Example 3a | 1-heptanal | 131.6 | 104.8 |
| Example 4a | 1-octanal | 138.6 | 138.1 |
| Example 1a | 1-nonanal | 148.9 | 133.0 |
| Example 6a | 1-decanal | 131.1 | 110.9 |
| Example 5a | benzaldehyde | 101.3 | 115.0 |
| Comparative Example 2a | mesitylene | 131.6 | 102.2 |
| Comparative Example 3a | toluene | 47.3 | 21.9 |
| Comparative Example 4a | 1-heptane | 48.5 | 32.1 |

TABLE 1-continued

| | Reaction Solvent | Molecular Weight (Mw) (Index) | Decomposition proportion (Index) |
|---|---|---|---|
| Comparative Example 5a | phenylethyl alcohol | 35.3 | 127.1 |

TABLE 2

| | Reaction Conditions | Molecular Weight (Mw) (Index) | Decomposition proportion (Index) |
|---|---|---|---|
| Example 1b | 160° C., 50 hours | 77.3 | 64.8 |
| Example 2b | 180° C., 2 hours | 75.6 | 37.9 |
| Example 3b (Example 1a) | 200° C., 2 hours | 148.9 | 133.0 |

TABLE 3

| | Reaction Solvent | Molecular Weight (Mw) (Index) | Decomposition proportion (Index) |
|---|---|---|---|
| Comparative Example 1c | 1-heptanol | 100.0 | 100.0 |
| Example 2c | 1-hexanal | 123.6 | 113.9 |
| Example 3c | 1-heptanal | 124.7 | 118.4 |
| Example 4c | 1-octanal | 102.0 | 104.7 |
| Example 1c | 1-nonanal | 155.7 | 169.8 |
| Example 5c | benzaldehyde | 132.3 | 158.2 |
| Comparative Example 2c | mesitylene | 88.2 | 68.2 |
| Comparative Example 3c | toluene | 74.0 | 45.4 |

<Liquid Hydrocarbon Production D>

Example 1d

In Example 1a, the decomposition step was carried out in the same manner except that the vulcanized rubber (IR) was changed to a vulcanized rubber (NR) and that the heating time (decomposition time) for the contents was changed from 2 hours to the time shown in Table 4. Subsequently, purification was carried out for solvent removal, and the drying step was carried out to give an organic decomposition product of Example 1d.

Comparative Example 1d

In Comparative Example 1a, the decomposition step and separation step were carried out in the same manner except that the vulcanized rubber (IR) was changed to a vulcanized rubber (NR), that the reaction solvent was changed from 1-heptanol to 1-octanol and that the heating time (decomposition time) for the contents was changed from 6 hours to the time shown in Table 4 to give an organic decomposition product of Comparative Example 1d.

Comparative Example 2d

In Comparative Example 1a, the decomposition step and separation step were carried out in the same manner except that the vulcanized rubber (IR) was changed to a vulcanized rubber (NR), that the reaction solvent was changed from 1-heptanol to 1-octanol and that the heating time (decomposition time) for the contents was changed from 6 hours to the time shown in Table 4 to give an organic decomposition product of Comparative Example 2d.

<Production of Re-vulcanized Rubber>

Rubber compositions were prepared according to the directions shown in Table 5, and vulcanized to give vulcanized rubbers.

Details of the components shown in Table 5 are as follows.

NR: Natural rubber

Carbon black: SAF grade

6C: Antiaging agent, N-phenyl-N'-(1,3-dimethylbutyl)-p-phenylenediamine, by Ouchi Shinko Chemical Industrial Co., Ltd., trade name "Noclak 6C"

DM: Vulcanization accelerator, di-2-benzothiazolyl disulfide, by Sanshin Chemical Industry Co., Ltd., trade name "Sanceler DM"

NS: Vulcanization accelerator, N-t-butyl-2-benzothiazyl sulfenamide, by Ouchi Shinko Chemical Industrial Co., Ltd., trade name "Nocceler NS"

DPG: Vulcanization accelerator, 1,3-diphenylguanidine, by Sanshin Chemical Industry Co., Ltd., trade name "Sanceler D"

<Analysis of Organic Decomposition Product>

The produced organic decomposition products were analyzed according to the same method as that for the organic decomposition product in Example 1a to determine the weight-average molecular weight (Mw) and the decomposition proportion, which are shown in Table 4 as three significant digits.

The molecular weight shown in Table 4 is, for example, in the case of Example 1d, $271 \times 10^3$, that is 271,000.

<Evaluation of Characteristics of Vulcanized Rubber>

In Comparative Example 1e to Comparative Example 5e, Example 1e and Example 2e, the tensile strength and the loss tangent (tan δ) of the vulcanized rubber were evaluated and shown in Table 5.

The resultant value of the tensile strength at break was indexed by setting the value of the tensile strength at break in Comparative Example 1e to 100. A larger index value means that the vulcanized rubber has a larger tensile strength at break.

2. Loss Tangent (tan δ)

The loss tangent (tan δ) of the vulcanized rubber was measured under the condition of a temperature 50° C., a strain 10%, and a frequency 15 Hz, using a viscoelasticity measuring device (by Rheometrics Corporation). The resultant value of tan δ was indexed by setting the value of a reciprocal number of tan δ in Comparative Example 1e to 100. A larger index value means that the vulcanized rubber has a better low-heat generation performance.

TABLE 4

| | | | Results of Decomposition Test | |
| | Reaction Solvent | Decomposition Time | Molecular Weight (Mw) ×10³ | Decomposition proportion (%) |
| --- | --- | --- | --- | --- |
| Example 1d | 1-nonanal | 8 | 271 | 68.8 |
| Comparative Example 1d | 1-octanol | 18 | 167 | 78.4 |
| Comparative Example 2d | 1-octanol | 6 | 162 | 54.9 |

TABLE 5

| | | Comparative Example 1e | Example 1e | Example 2e | Comparative Example 2e | Comparative Example 3e | Comparative Example 4e | Comparative Example 5e |
| --- | --- | --- | --- | --- | --- | --- | --- | --- |
| NR | part | 100 | 100 | 100 | 100 | 100 | 100 | 100 |
| Organic Decomposition Product obtained in Example 1d | part | 0 | 30 | 70 | 0 | 0 | 0 | 0 |
| Organic Decomposition Product obtained in Comparative Example 1d | part | 0 | 0 | 0 | 30 | 70 | 0 | 0 |
| Organic Decomposition Product obtained in Comparative Example 2d | part | 0 | 0 | 0 | 0 | 0 | 30 | 70 |
| Carbon black | part | 50 | 50 | 50 | 50 | 50 | 50 | 50 |
| Stearic acid | part | 1 | 1 | 1 | 1 | 1 | 1 | 1 |
| Zinc oxide | part | 2.5 | 2.5 | 2.5 | 2.5 | 2.5 | 2.5 | 2.5 |
| Sulfur | part | 1.3 | 1.3 | 1.3 | 1.3 | 1.3 | 1.3 | 1.3 |
| 6C | part | 1.5 | 1.5 | 1.5 | 1.5 | 1.5 | 1.5 | 1.5 |
| DM | part | 0.7 | 0.7 | 0.7 | 0.7 | 0.7 | 0.7 | 0.7 |
| NS | part | 1.8 | 1.8 | 1.8 | 1.8 | 1.8 | 1.8 | 1.8 |
| DPG | part | 1.4 | 1.4 | 1.4 | 1.4 | 1.4 | 1.4 | 1.4 |
| Index of TB | — | 100 | 93 | 93 | 90 | 86 | 89 | 77 |
| Index of reciprocal number of 10% tanδ | — | 100 | 91 | 96 | 87 | 89 | 88 | 84 |

1. Tensile Strength

The tensile strength of the vulcanized rubber was evaluated from the viewpoint of the tensile strength at break (TB). For measuring the tensile strength at break, the vulcanized rubber was 100% elongated at room temperature (23° C.) according to JIS K 6251(2017), and the maximum tension needed for break was measured.

As known from Tables 1 to 3, in Examples, rubber compositions containing a liquid hydrocarbon having a higher molecular weight can be produced at a higher decomposition proportion, as compared with Comparative Examples.

Also as known from Table 4, vulcanized rubbers produced from liquid hydrocarbon-containing rubber compositions of Examples can still maintain the large tensile strength even when added in an amount of 70 parts by mass (Example 2e) and also can maintain tan δ, as compared with vulcanized rubbers produced from liquid hydrocarbon-containing rubber compositions of Comparative Examples.

The invention claimed is:

1. A method of producing a rubber composition containing a liquid hydrocarbon, which comprises heating a crosslinked rubber at 300° C. or lower in a reaction solvent that comprises an aldehyde having a hydrocarbon group with 2 or more carbon atoms and having a boiling point of 230° C. or lower, wherein the content of the aldehyde having a hydrocarbon group with 2 or more carbon atoms and having a boiling point of 230° C. or lower in the reaction solvent is more than 50% by volume.

2. The production method for a rubber composition according to claim 1, wherein the carbon number of the hydrocarbon group is 3 to 16.

3. The production method for a rubber composition according to claim 1, wherein the carbon number of the hydrocarbon group is 6 to 10.

4. The production method for a rubber composition according to claim 1, wherein the hydrocarbon group is a linear saturated aliphatic group.

5. The production method for a rubber composition according to claim 1, wherein the aldehyde comprises nonanal.

6. The production method for a rubber composition according to claim 1, wherein the crosslinked rubber is heated at 150 to 250° C.

7. The production method for a rubber composition according to claim 1, wherein the crosslinked rubber is a crosslinked product of a rubber component comprising 50 to 100% by mass of a dienic rubber.

8. The production method for a rubber composition according to claim 1, wherein the crosslinked rubber comprises a vulcanized rubber.

9. A re-crosslinked rubber obtained by re-crosslinking the rubber composition produced according to the rubber composition production method of claim 1, which comprises the liquid hydrocarbon comprised in the rubber composition as a rubber component and in which the content of the liquid hydrocarbon in the rubber component is 1 to 100% by mass.

10. A tire formed of the re-crosslinked rubber of claim 9.

11. A rubber industrial product formed of the re-crosslinked rubber of claim 9.

12. The production method for a rubber composition according to claim 2, wherein the carbon number of the hydrocarbon group is 6 to 10.

13. The production method for a rubber composition according to claim 2, wherein the hydrocarbon group is a linear saturated aliphatic group.

14. The production method for a rubber composition according to claim 2, wherein the aldehyde comprises nonanal.

15. The production method for a rubber composition according to claim 2, wherein the crosslinked rubber is heated at 150 to 250° C.

16. The production method for a rubber composition according to claim 2, wherein the crosslinked rubber is a crosslinked product of a rubber component comprising 50 to 100% by mass of a dienic rubber.

17. The production method for a rubber composition according to claim 2, wherein the crosslinked rubber comprises a vulcanized rubber.

18. A re-crosslinked rubber obtained by re-crosslinking the rubber composition produced according to the rubber composition production method of claim 2, which comprises the liquid hydrocarbon comprised in the rubber composition as a rubber component and in which the content of the liquid hydrocarbon in the rubber component is 1 to 100% by mass.

19. The production method for a rubber composition according to claim 3, wherein the hydrocarbon group is a linear saturated aliphatic group.

20. The production method for a rubber composition according to claim 3, wherein the aldehyde comprises nonanal.

* * * * *